United States Patent
Ali

(10) Patent No.: US 10,599,628 B2
(45) Date of Patent: Mar. 24, 2020

(54) MULTI-NETWORK SYSTEMS AND METHODS FOR PROVIDING CURRENT BIOGRAPHICAL DATA OF A USER TO TRUSTED PARTIES

(71) Applicant: MasterCard International Incorporated, Purchase, NY (US)

(72) Inventor: Muhammad Yaseen Ali, Dublin (IE)

(73) Assignee: Mastercard International Incorporated, Purchase, NY (US)

( * ) Notice: Subject to any disclaimer, the term of this patent is extended or adjusted under 35 U.S.C. 154(b) by 217 days.

(21) Appl. No.: 15/612,807

(22) Filed: Jun. 2, 2017

(65) Prior Publication Data
US 2018/0349426 A1 Dec. 6, 2018

(51) Int. Cl.
| | |
|---|---|
| G06F 16/23 | (2019.01) |
| G06Q 20/40 | (2012.01) |
| G06Q 30/06 | (2012.01) |
| G06Q 20/34 | (2012.01) |
| G06F 21/62 | (2013.01) |
| H04L 29/06 | (2006.01) |
| G06Q 30/02 | (2012.01) |

(52) U.S. Cl.
CPC .......... *G06F 16/23* (2019.01); *G06F 21/6245* (2013.01); *G06Q 20/34* (2013.01); *G06Q 20/4016* (2013.01); *G06Q 30/06* (2013.01); *H04L 63/101* (2013.01); *G06Q 30/0255* (2013.01)

(58) Field of Classification Search
CPC ...... G06F 16/23; G06F 21/6245; G06Q 20/34
See application file for complete search history.

(56) References Cited

U.S. PATENT DOCUMENTS

| | | | |
|---|---|---|---|
| 7,035,872 | B2 | 4/2006 | Phillips et al. |
| 7,702,538 | B2 | 4/2010 | Rau et al. |
| 7,904,389 | B2 | 3/2011 | Digioacchino |
| 7,925,587 | B2 | 4/2011 | Digioacchino |
| 7,966,257 | B2 | 6/2011 | Digioacchino |

(Continued)

OTHER PUBLICATIONS

PCT International Search Report and Written Opinion, Application No. PCT/US2018/030796, dated Aug. 10, 2018, 13 pps.

(Continued)

*Primary Examiner* — Loc Tran
(74) *Attorney, Agent, or Firm* — Armstrong Teasdale LLP

(57) ABSTRACT

An automatic user biographical data updater (BDU) computing device for automatically updating user biographical data is provided. The BDU computing device includes at least one processor in communication with at least one memory device. The BDU computing device is configured to receive user biographical data, to store the user biographical data in the at least one memory device, and to receive a data access request for the user biographical data from a trusted party. The BDU computing device is also configured to generate a trusted party data access link, to transmit the trusted party data access link to the trusted party, to receive updated user biographical data, to store the updated user biographical data, and to electronically link the stored updated user biographical data to the trusted party data access link. The BDU computing device is also configured to transmit an updated data notification message to the trusted party.

21 Claims, 6 Drawing Sheets

(56) References Cited

U.S. PATENT DOCUMENTS

| | | | |
|---|---|---|---|
| 8,036,963 B2 | 10/2011 | Carroll et al. | |
| 9,530,130 B2 | 12/2016 | Rosano | |
| 2005/0075977 A1 | 4/2005 | Carroll et al. | |
| 2006/0178937 A1 | 8/2006 | Rau et al. | |
| 2006/0271394 A1* | 11/2006 | Kelly | G06Q 10/00 |
| | | | 705/7.36 |
| 2009/0171839 A1 | 7/2009 | Rosano et al. | |
| 2010/0036769 A1* | 2/2010 | Winters | G06Q 20/10 |
| | | | 705/40 |
| 2011/0153500 A1 | 6/2011 | Digioacchino | |
| 2012/0296824 A1 | 11/2012 | Rosano | |
| 2013/0030972 A1 | 1/2013 | Digioacchino | |
| 2017/0116585 A1* | 4/2017 | Rosano | G06Q 40/12 |
| 2018/0108008 A1* | 4/2018 | Chumbley | G06Q 20/3674 |
| 2019/0012672 A1* | 1/2019 | Francesco | G06Q 20/34 |

OTHER PUBLICATIONS

Drew Prindle: "Updater makes changing your address a breeze I Digital Trends", Dec. 2, 2014, XP055490722, Retrieved from the Internet: URL:https://web.archive.org/web/20170226233501/https://www.digitaltrends.com/home/update-address-app/, [retrieved on Jul. 6, 2018], 5 pages.

"JSON API—Examples", May 26, 2017, XP055490575, Retrieved from the Internet: URL:https://web.archive.org/web/20170526073517/http://jsonapi.org/examples/, [retrieved on Jul. 5, 2018], 10 pages.

* cited by examiner

MULTI-NETWORK SYSTEMS AND METHODS FOR PROVIDING CURRENT BIOGRAPHICAL DATA OF A USER TO TRUSTED PARTIES

BACKGROUND

The disclosure relates generally to data processing within multi-computer networks, and, more particularly, to multi-networked-based systems and methods for storing and processing biographical information of a user, and providing said up-to-date biographical information to trusted parties.

In today's modern world, individuals are becoming increasingly more transient, and throughout the course of a given year may have multiple temporary or semi-permanent addresses for work or other reasons. Many of the services needed at a residence (power, water, electricity, mail, internet, grocery delivery, etc.) are cumbersome and time-consuming to transfer or terminate. Other services are less difficult to transfer to a new address (AMAZON®, automobile and homeowner/renter insurance, etc.), but the person has to remember to make the changes and still must visit multiple virtual or physical addresses to complete the changes (Amazon is a registered trademark of Amazon.com Incorporated located in Seattle, Wash.). Additionally, upon arriving in a new area, the user may be unsure as to which service providers are present in the area and may have to spend a substantial quantity of time simply determining if they will have to utilize a new power company, for example. In instances where a user has a temporary address, but returns to a permanent address regularly, the user will have to complete the entire switching process multiple times. This may be at the cost of significant quantities of time, with the possibility of potentially costly mistakes. Many of these services are, or may be, paid for through the use of a payment card. Such a payment card may represent at least one variable that typically remains constant throughout an individual's travels and relocations. The payment card may also have at least some user biographical data associated with it.

At least some known card-updater systems may provide merchants with updated payment card information. These known systems work with the issuer and the acquiring bank to forward the updated billing data to the merchant, which may then update its database of account-on-file payment card information. However, these known systems are limited in several ways. For example, the data that is typically updated is only billing data, and does include address data of the cardholder. Additionally, these known systems are usually only used by certain merchants.

Accordingly, a system and method is needed that utilizes known protocols for communicating information between mobile computing devices, merchant computing devices, and payment computing devices to facilitate and further automate a user updating their personal biographical data at a single entry location while having the personal information disseminated to multiple trusted parties of their choosing.

BRIEF DESCRIPTION

In one aspect, an automatic user biographical data updater (BDU) computing device for automatically updating user biographical data is provided. The BDU computing device includes at least one processor in communication with at least one memory device. The BDU computing device is configured to receive user biographical data and an account identifier associated with a user, to store the user biographical data along with the account identifier in the at least one memory device, and to receive a data access request for the user biographical data from a trusted party. The BDU computing device is also configured to generate a trusted party data access link configured to provide user biographical data by providing access to the user biographical data stored within the at least one memory device. The BDU computing device is further configured to transmit the trusted party data access link to the trusted party, wherein the trusted party data access link enables the trusted party to access the user biographical data. The BDU computing device is configured to receive updated user biographical data, to store the updated user biographical data in the at least one memory device, and to electronically link the stored updated user biographical data to the trusted party data access link. The BDU computing device is also configured to transmit an updated data notification message to the trusted party, wherein the notification message includes the trusted party data access link.

In another aspect, a computer-implemented method for automatically updating user biographical data is provided. The method is implemented using a BDU computing device including at least one processor in communication with at least one memory device. The method includes receiving user biographical data and an account identifier associated with a user, storing the user biographical data along with the account identifier in the at least one memory device, and receiving a data access request for the user biographical data from a trusted party. The method also includes generating a trusted party data access link configured to provide user biographical data by providing access to the user biographical data stored within the at least one memory device. The method further includes transmitting the trusted party data access link to the trusted party, wherein the trusted party data access link enables the trusted party to access the user biographical data. The method includes receiving updated user biographical data, storing the updated user biographical data in the at least one memory device, and electronically linking the stored updated user biographical data to the trusted party data access link. The method also includes transmitting an updated data notification message to the trusted party, wherein the notification message includes the trusted party data access link.

In yet another aspect, a non-transitory computer readable medium including computer executable instructions for automatically updating user biographical data by a computing device is provided. When executed by a BDU computing device including a processor and a memory device, the computer executable instructions cause the BDU computing device to receive user biographical data and an account identifier associated with a user, to store the user biographical data along with the account identifier in the at least one memory device, and to receive a data access request for the user biographical data from a trusted party. The computer executable instructions also cause the BDU computing device to generate a trusted party data access link configured to provide user biographical data by providing access to the user biographical data stored within the at least one memory device. The computer executable instructions further cause the BDU computing device to transmit the trusted party data access link to the trusted party, wherein the trusted party data access link enables the trusted party to access the user biographical data. The computer executable instructions cause the BDU computing device to receive updated user biographical data, to store the updated user biographical data in the at least one memory device, and to electronically link the stored updated user biographical data to the trusted party data access link. The computer executable instructions also cause the BDU computing device to transmit an updated data notification message to the trusted party, wherein the notification message includes the trusted party data access link.

BRIEF DESCRIPTION OF THE DRAWINGS

FIG. 1 is a schematic diagram illustrating an example automatic cardholder biographical data updater (BDU) system for linking user biographical data and card profile data to each other.

FIG. 2 is an example data flow diagram of the system shown in FIG. 1.

FIG. 3 is an expanded block diagram of an example embodiment of a remote device for use in the system shown in FIG. 1.

FIG. 4 illustrates an example configuration of a host system for use in the system shown in FIG. 1.

FIG. 5 is a flowchart of an example process for storing and providing updated user biographical data to a trusted party using the system shown in FIG. 1.

FIG. 6 is a diagram of components of one or more example computing devices that may be used in embodiments of the described systems and methods.

DETAILED DESCRIPTION

Figure 1:
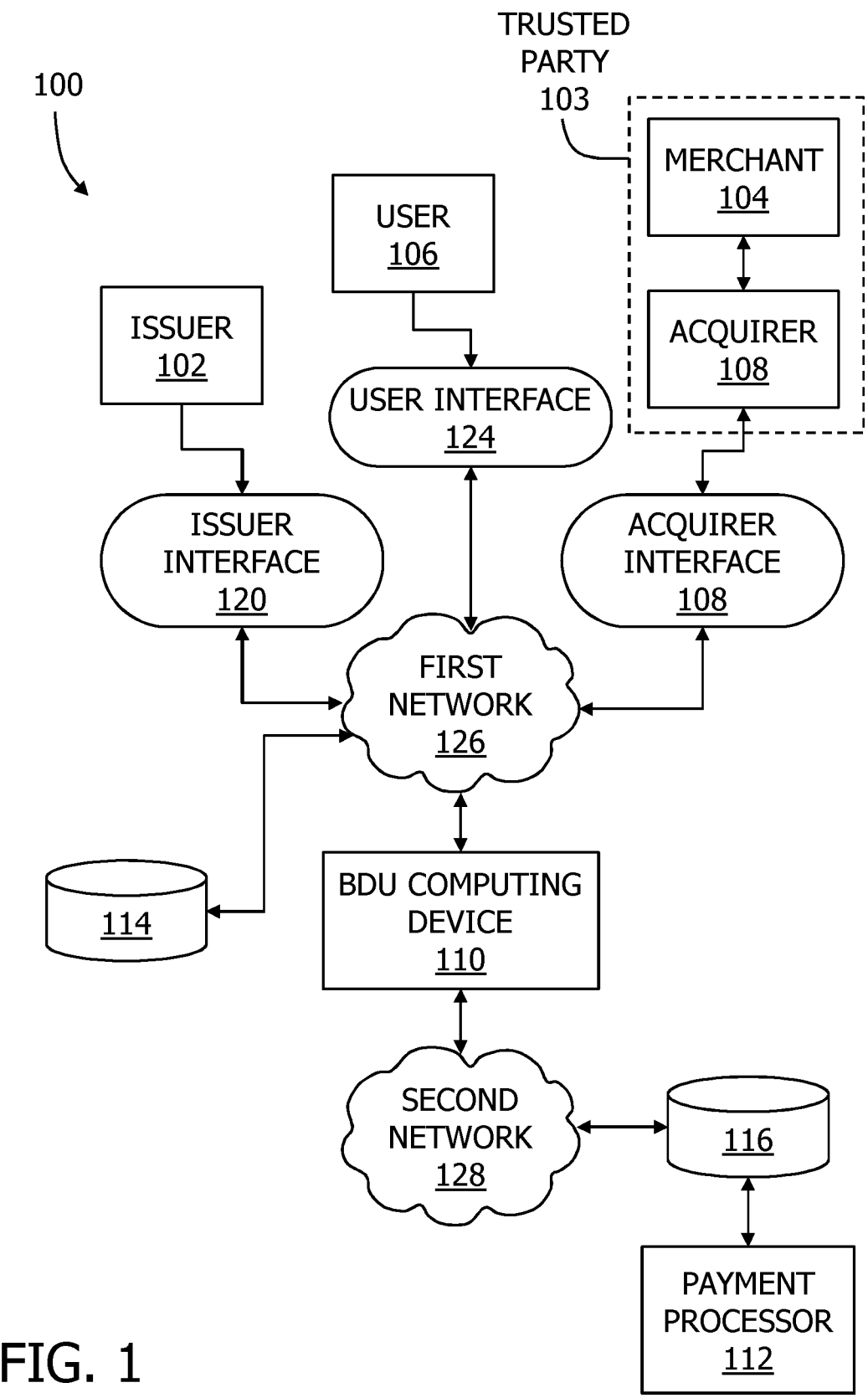
FIGS. 1-6 show example embodiments of the methods and systems described herein.

The embodiments described herein are directed to systems and methods for updating personal biographical information of a user with a plurality of interested and trusted parties using an automatic biographical data updater (BDU) system. The BDU system includes a BDU computing device for maintaining biographical data of the user's choosing, and for retrieving this biographical data associated with a user to be provided to a trusted requesting party (e.g., an acquirer bank, a merchant, etc.).

The BDU computing device is in communication with a plurality of parties including, for example, issuers, acquirers, merchants, and/or other interested parties over a first network (e.g., internet, private network, or some other secure network), and provides an automatic biographical data updater service. More particularly, the BDU computing device is configured to provide a biographical updater service that provides a user's updated biographical data (e.g., address) to a trusted third-party so that the user does not have to individually provide such updates. The issuers communicate with the BDU computing device using a backend interface (e.g., an issuer interface), while the trusted third parties, including acquirers, merchants and other interested parties, communicate with the BDU computing device using a front-end interface (e.g., a trusted party interface). The users communicate with the BDU computing device using a user interface. These interfaces may be web interfaces, such as a web page or an interface configured to access the data by making API calls.

The BDU computing device periodically receives biographical data from one or more users enrolled in the BDU service through the user interface and maintains the biographical data in a biographical data store, which may be a database or other memory device. The BDU computing device also periodically receives updated biographical data from one or more issuers enrolled in the BDU service through the backend interface and maintains the biographical data in the same biographical data store. The biographical data may include a user's address(es), contact information, primary account number (PAN), an expiry date and an initial start date of residency for the address(es), and/or a plurality of other information associated with a user's account. The biographical data received from the users may include updated biographical data that replaces expired biographical data for a user account. The biographical data received from the issuers may also include updated biographical data that replaces expired biographical data for a user account.

A trusted party may receive access to a user's biographical data from the BDU computing device by submitting an access request. In response to a request from for access from a trusted party, if the user has granted permission, the BDU computing device will generate a trusted party data access link and provide the trusted party data access link to the trusted party. The trusted party data access link may be a personalized web page, for example, and is configured to enable communication of the biographical data associated with the user to the trusted party. A trusted party may then submit a biographical data update request requesting the biographical data of a user. For example, if a trusted party enrolled in the BDU service wishes to verify biographical data for account-on-file transactions, or for any other reason, the trusted party may, directly or indirectly through an acquirer, submit a request to the BDU computing device. In certain embodiments, multiple update requests from one or more trusted parties may be collected by an acquirer and submitted to the BDU computing device as a batch file.

Each update request may include an account identifier, such as a PAN or other identifier for identifying the user. In one embodiment, the update request includes an acquirer ID, a trusted party ID, a PAN or token, an expiry date, and discretionary data (e.g., a record identifier for the acquirer). In other embodiments, the update requests include additional, fewer, or alternative data elements, including those described elsewhere herein. In response to receiving an update request, the BDU computing device may first verify that a user account with the requested biographical data exists. Next, the BDU computing device may then determine that the user has granted permission for the requesting trusted party to receive the biographical data. Then, the BDU device may look up or otherwise retrieve biographical data in the biographical data store corresponding to the account identifier, and generate an update response message notifying the trusted party that the biographical data has been retrieved and is available for review. The trusted party may then access the retrieved biographical data through the communication link. The retrieved biographical data may include any or all of the biographical data for the user stored by the biographical data store.

In some embodiments, the BDU computing device may only retrieve updated biographical data (e.g., biographical data the BDU computing device has not previously retrieved for the trusted party). In one embodiment, the BDU computing device or the BDU data store is configured to receive and/or store a record of the biographical data currently stored by the trusted party. The trusted party biographical data record is compared to the up-to-date biographical data to identify any updated biographical data. In some embodiments, each record represents biographical data for one user account in the BDU data store and includes a list of trusted parties that have previously requested the biographical data for the user account. The record may also indicate the last time an update request associated with a particular trusted party occurred. In such embodiments, the BDU computing device may be configured to determine whether or not the biographical data for a particular user account has been updated since the previous update request. If the biographical data has been updated since the previous update request, the BDU computing device identifies the biographical data as updated biographical data. If biographical data for a particular update request has not changed, the BDU computing device may indicate the biographical data has not changed in the response to the acquirer or trusted party. In certain embodiments, the BDU computing device may maintain a record for each user account with historical biographical data over a predetermined period of time (e.g., two years).

In another example embodiment, the BDU computing device is further configured to offer an additional service (referred to as a "profile service" herein) in conjunction with the BDU service. The profile service includes providing the trusted parties with additional data associated with user cardholder accounts for account-on-file transactions. If the BDU computing device detects that a trusted party associated with a received update request is enrolled in the profile service, the BDU computing device transmits a card profile query based on the update request to a card profile data store (e.g., a database) over a second network. The card profile query includes the account identifier to facilitate identifying and retrieving card profile data associated with the update request. The card profile data includes data associated with the user account that is retrieved, generated, or otherwise collected by a system other than the BDU system. The card profile data may include, but is not limited to, fraud history, chargeback history, historical transaction data, customer loyalty profiles, spending behaviors, location information (e.g., delivery address), user cardholder information, and so forth.

The second network is separate from the first network. In the example embodiment, the second network is a payment network, and the card profile data store is in communication with a payment processor. The payment network is a closed network (i.e., connection to the payment network requires permission for the administrator of the payment network). The payment network is configured to facilitate generating, receiving, and/or transmitting messages associated with transactions for one or more trusted parties, issuers, and acquirers in communication with the payment network. In particular, the payment network is configured to facilitate generating, receiving, and/or transmitting messages associated with payment card transactions. These messages may be formatted according to specific protocols associated with the payment network to provide different information and functions. For example, the payment network may be configured to process authorization messages, such as ISO® 8583 compliant messages and ISO® 20022 compliant messages. As used herein, "ISO®" refers to a series of standards approved by the International Organization for Standardization (ISO is a registered trademark of the International Organization for Standardization of Geneva, Switzerland). ISO® 8583 compliant messages are defined by the ISO® 8583 standard which governs financial transaction card originated messages and further defines acceptable message types, data elements, and code values associated with such financial transaction card originated messages. ISO ® 8583 compliant messages include a plurality of specified locations for data elements. ISO® 20022 compliant messages are defined by the ISO® 20022 standard. For example, ISO® 20022 compliant messages may include acceptor to issuer card messages (ATICA).

The payment processor receives and/or generates the card profile data and transmits the card profile data to the card profile data store for storage. In one example, the BDU computing device transmits the card profile query to the card profile data store. In another example, the BDU computing device transmits the card profile query to the payment processor to cause the payment processor to retrieve the card profile data associated with the query. The card profile data store performs a lookup to detect and retrieve stored card profile data associated with the query. In some embodiments, the card profile data store may selectively retrieve card profile data that has been updated since a previous card profile query. The card profile data store generates a profile query response including the retrieved card profile data and transmits the response to the BDU computing device.

The BDU computing device receives the profile query response and determines if permission has been granted by the account holder user to release the requested data. If permission has been granted by the user via the user interface, the BDU computing device generates an update response message that includes the retrieved biographical data from the biographical data store and the received card profile data. If permission has not been granted, or the biographical information requested does not exist, only the received card profile data will be generated by the BDU computing device in its update response message. In one embodiment, the BDU computing device includes a translator module. The translator module is configured to receive the biographical data and the card profile data, parse the data, and generate the update response message based on the parsed data. The translator module enables the BDU computing device to receive data in a particular format associated with the biographical data store or the card profile data store, and provide the received data in a unified format. In one example, the update response message is generated in a JavaScript Object Notation (JSON) format. If the update response message separates the biographical data and the card profile data between 'no change' (i.e., the data stored by the trusted party has not changed) and 'updated', then the update response message may indicate a reason why the biographical data and/or card profile data has been updated. For example, if the previous biographical data stored by the trusted party includes a past address, the updated biographical data may indicate a new primary address for the user. The BDU computing device then sends the update response message to the trusted party to notify the trusted party that the biographical data has been retrieved and is available for review. The trusted party may then access the retrieved biographical data through the communication link. The trusted party may update their stored biographical data based on the biographical data from the obtained through the communication link. The card profile data may be used by the trusted party to facilitate reducing false positive fraud challenges, providing additional benefits to the user cardholders associated with the user accounts, and providing targeted advertising to the user cardholders.

By providing both the biographical data and the card profile data in a single update response message to the trusted party, thereby unifying the BDU service and the profile service, the BDU computing device facilitates a reduced number of responses transmitted to the trusted party in comparison to providing the BDU service and the profile service separately. BDU computing device facilitates faster responses, reduced bandwidth consumption, and improved efficiency of computer resources of the BDU system by reducing the number of responses transmitted to the trusted party. In addition, providing the card profile data at the same time as the biographical data to the trusted party enables the trusted party to take actions associated with the account-onfile transactions based on the card profile data. For example, if the card profile data does not match the user biographical data (e.g., non-matching billing addresses), the trusted party can preemptively pause the transaction or automatically update the billing address so that the transaction is not declined later. In another example, if the card profile data includes fraud history or compromised account alerts, the trusted party can preemptively cancel an account-on-file transaction if the account is compromised. If the trusted party received the biographical data and card profile data separately, the trusted party may not receive the card profile data in time for the account-on-file transaction, and the transaction is processed without knowledge that the account is compromised.

In one example, a trusted party receives card profile data for a user payment account that has a recurring payment with the trusted party. The card profile data includes a fraud history that indicates there has been a recent report of fraud associated with the user payment account. Before the next recurring payment is initiated, the trusted party may contact a user cardholder of the user payment account to determine whether or not the user payment account has been compromised. If the account has been compromised, the trusted party may cancel the recurring payment and request biographical data for a different payment account of the user cardholder. By preemptively contacting the user cardholder, the trusted party may avoid chargebacks and interrupting the recurring payments.

In another example, a trusted party receives card profile data for a user payment account registered for a service provided by the trusted party. The card profile data includes historical transaction data and spending behaviors for the user payment account. Based on the transaction data and the spending behaviors, the trusted party determines that services similar to the service provided by trusted party are generally cancelled after six months. The trusted party may push a loyalty reward or other incentives to the user cardholder of the user payment account after five months to attempt to keep the user cardholder as a customer.

In yet another example, a trusted party receives card profile data and biographical data for a user payment account registered for a service provided by the trusted party, such as cable interne. The user's card profile data and biographical data include information about future residences and dates the user will be at the residences. Based on the services provided by the trusted party to the user, the user's payment account historical transaction data, and the user's biographical data, the trusted party is able to determine if they will be able to continue providing their service to the user. The trusted party may push an incentive or a notification to the user that they may be able to continue utilizing the trusted party's services at their future residence.

Although the BDU service and the profile service are described above as parallel, complimentary services, it is to be understood that these services may also be performed separately. For example, a trusted party may request updated card profile data every month, but only wants updated biographical data from the first network every two months. In such an example, the BDU computing device may transmit a profile query notification message to the trusted party's trusted party data access link even if the BDU service is not performed.

The methods and systems described herein may be implemented using computer programming or engineering techniques including computer software, firmware, hardware or any combination or subset thereof, wherein the technical effects may be achieved by performing one of the following steps: (i) receiving user biographical data and an account identifier associated with a user; (ii) storing the user biographical data along with the account identifier in the at least one memory device; (iii) receiving a data access request for the user biographical data from a trusted party; (iv) generating a trusted party data access link, configured to provide user biographical data by providing access to the user biographical data stored within the at least one memory device; (v) transmitting the trusted party data access link to the trusted party, wherein the trusted party data access link enables the trusted party to access the user biographical data; (vi) receiving updated user biographical data; (vii) storing the updated user biographical data in the at least one memory device; (viii) electronically linking the stored updated user biographical data to the trusted party data access link; and (ix) transmitting an updated data notification message to the trusted party, wherein the notification message includes the trusted party data access link.

The systems and methods described herein are configured to facilitate (a) reduced number of responses transmitted to the trusted party; (b) preemptively linking data from separate services together prior to the trusted party receiving the data; (c) a unified schedule for receiving the data from separate services; and (d) enhanced information associated with user and account-on-file payment accounts.

Described herein are computer systems such as a payment processor, a user device, and a data mapping computing device. As described herein, all such computer systems include a processor and a memory.

Further, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium.

In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

The systems and processes are not limited to the specific embodiments described herein. In addition, components of each system and each process can be practiced independent and separate from other components and processes described herein. Each component and process also can be used in combination with other assembly packages and processes.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, smartphones, personal digital assistants (PDAs), key fobs, and/or computers. Each type of transaction card can be used as a method of payment for performing a transaction.

The following detailed description illustrates embodiments of the disclosure by way of example and not by way of limitation. It is contemplated that the disclosure has general application to provide cardholder information to account-on-file trusted parties.

FIG. 1 is a schematic diagram illustrating an example automatic user biographical data updater (BDU) system 100 including a BDU computing device 110 for automatically updating user biographical data. In the example embodiment, system 100 includes an issuer 102, a plurality of trusted parties 103, a user 106, a payment processor 112, an automatic BDU database 114, and a card profile database 116. In other embodiments, system 100 may include additional, fewer, or alternative subsystems, including those described elsewhere herein. For example, system 100 may include a plurality of issuers 102, and/or users 106.

In the example embodiment, issuer 102 is a bank or other financial institution that provides payment accounts and payment cards to cardholders. Issuer 102 is configured to maintain an up-to-date record of the cardholders' payment accounts to facilitate processing transactions. In one example, among other information, issuer 102 is configured to store a PAN and an expiration or expiry date for each payment card of the cardholders associated with issuer 102. If the cardholder requests a new payment card (e.g., when the expiry date is approaching), issuer 102 updates its records with new payment card information when the payment card is sent to the cardholder. If the new payment card is replacing a previous payment card, the previous payment card may be deactivated to prevent potentially fraudulent transactions with the previous card.

User 106 is an account holder associated with a user account. In at least some embodiments, user 106 has an account-on-file payment account with at least one merchant 104. User 106 enters biographical data that is stored in BDU database 114 including at least a current address, and that may include a future address(es), business and home addresses, phone numbers, and a plurality of other personal biographical data.

Trusted party 103 is party trusted by the user to receive the user's biographical data. In the example embodiment, plurality of trusted parties 103 includes a merchant 104 and an acquirer 108. Merchant 104 is an account-on-file merchant. That is, merchant 104 stores payment information for one or more user 106 cardholders to facilitate purchases without requiring the cardholder to re-enter payment information if the cardholder is a repeat customer. For example, if user 106 has purchased a subscription-based service or product through merchant 104, merchant 104 may automatically bill user 106 at the end of a recurring time period (e.g., one month). In another example, a user 106 may have an account registered with merchant 104. Merchant 104 may store payment information for user 106 with the account to enable user 106 to simply select the stored payment information to complete a purchase. In at least some embodiments, the account-on-file transactions with merchant 104 are card-not-present (CNP) transactions. In the example embodiment, for account-on-file payment accounts, merchant 104 stores records including at least a current PAN, expiry date, and user identifier associated with each payment account. The user identifier may be, for example, an identifier that identifies user 106 or the account associated with the stored record, such as a username. In other suitable embodiments, trusted party 103 is any party that user 106 desires to provide biographical data to using BDU system 100.

Acquirer 108 is associated with merchant 104. In particular, acquirer 108 is a bank or other financial institution that maintains a payment account of merchant 104. Acquirer 108 is configured to perform at least some payment actions on-behalf-of merchant 104, such as communicate with issuer 102 to settle payments.

BDU computing device 110 is in communication with issuer 102, merchant 104, user 106, and acquirer 108 over a first network 118. In one embodiment, first network 118 is the Internet. In the example embodiment, issuer 102 communicates with BDU computing device 110 through an issuer interface 120. Merchant 104 and acquirer 108 communicate with BDU computing device 110 through an acquirer interface 122. User 106 communicates with BDU computing device 110 through a user interface 124. Although it is shown that merchant 104 communicates through acquirer 108, it is to be understood that merchant 104 may access interface 122 directly. Interfaces 120, 122, 124 may be, but are not limited to, web interfaces, command line interfaces, messaging interfaces, and the like.

BDU computing device 110 is further in communication with card profile database 116 over a second network 126. Second network 126 is separate from first network 118. In the exemplary embodiment, second network 126 is a payment network and BDU computing device 110 is communicatively coupled to payment processor 112 of payment network 126 to receive user 106 card profile data 212. Alternatively, BDU computing device 110 is in communication with issuer 102, merchant 104, user 106, and acquirer 108 over a first communication channel and card profile database 116 over a second, separate communication channel. The first and second communication channels may be part of the same network.

In the example embodiment, card profile database 116 is configured to store card profile data (not shown in FIG. 1). The card profile data includes information associated with payment accounts and/or cardholders of the payment accounts. For example, card profile data may include, but is not limited to, historical transaction data, shopping behaviors, reported fraudulent activity, chargeback history, and/or other transaction-based profiles associated with a cardholder and a payment account of user 106. Although card profile database 116 is shown as single database, it is to be understood that database 116 may be a plurality of databases in communication with BDU computing device 110 over second network 126. Each database may profile a particular data element of the card profile data (e.g., shopping behaviors in one database and fraud history in another). In the example embodiment, the card profile data is generated and/or collected by payment processor 112.

Payment processor 112 is configured to process transactions within a payment network. That is, payment processor 112 is configured to receive, process, and/or transmit transaction data, authorization messages (e.g., ISO® 8583 compliant messages and ISO® 20022 compliant messages), and other transaction-related messages from merchant 104, within the payment network. The payment network is configured to facilitate processing transactions (e.g., payment card transactions) by providing particular message protocols to merchants, issuers, acquirers, and payment processor 112 to perform particular functions within the payment network. In the example embodiment, the payment network is a closed network. That is, the payment network is configured to prevent unpermitted access to the messages within the payment network.

The data received, processed, and/or transmitted by payment processor 112 may be used to generate card profile data. In some embodiments, the data is directly included within the card profile data. Payment processor 112 is in communication with card profile database 116 to transmit the card profile data for storage. Additionally or alternatively, one or more different computing devices associated with transaction data are communicatively coupled to card profile database 116 to provide at least a portion of the card profile data.

Figure 2:
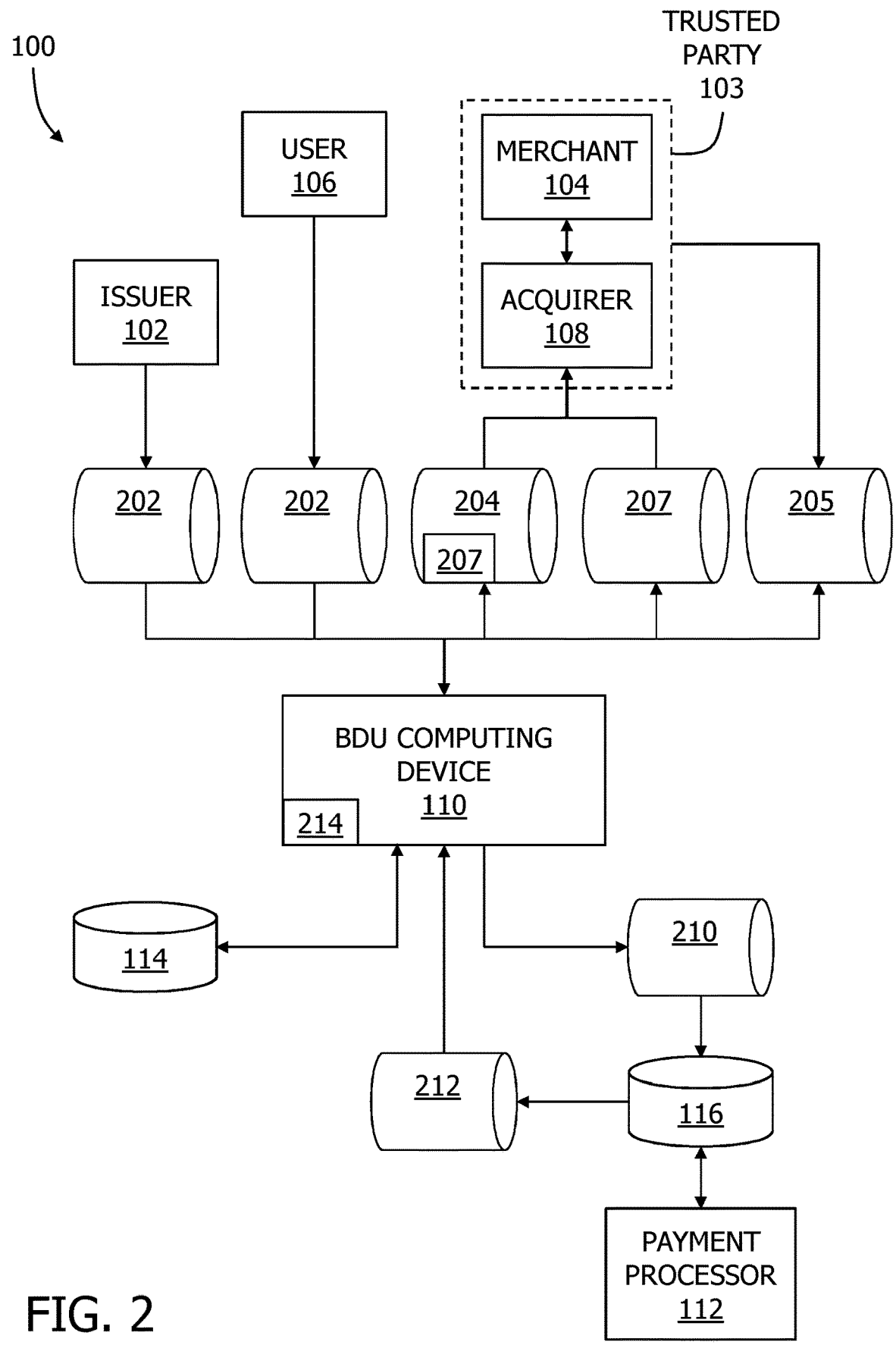

FIG. 2 is an example data flow diagram of system 100 (shown in FIG. 1). In particular, FIG. 2 depicts data flow between issuer 102, merchant 104, user 106, acquirer 108, BDU computing device 110, payment processor 112, BDU database 114, and card profile database 116. In other embodiments, system 100 may provide additional, fewer, or alternative data, including those described elsewhere herein.

With reference to FIGS. 1 and 2, in the example embodiment, BDU computing device 110 includes at least one processor in communication with at least one memory device. In the exemplary embodiment, the at least one memory device is a BDU database 114. BDU computing device 110 is configured to receive user 106 biographical data 202 and an account identifier 206 associated with user 106. BDU computing device 110 periodically receives biographical data 202 from issuer 102 through issuer interface 120, and/or from user 106 through user interface 124. Biographical data 202 includes, but is not limited to, a home address(es), a business address, a temporary address(es), dates when at specific addresses, next of kin, phone numbers, and/or other information associated with a user. Biographical data 202 may include updated biographical data, such as updated biographical data to replace outdated biographical data associated with a user's payment card, and/or new biographical data for new account-on-file transactions.

In the exemplary embodiment, BDU computing device 110 is configured to store user 106 biographical data 202 in memory. In one embodiment, biographical data 202 is stored in one or more tables within BDU database 114 that are configured to store biographical data. BDU computing device 110 may receive a biographical data access request 205 associated with user 106 and from at least one trusted party 103, such as merchant 104. Updated data notification message 204 is configured to identify a cardholder and payment account that is registered for account-on-file transactions with merchant 104. Each updated data notification message 204 includes an account identifier 206, such as a PAN or token. In some embodiments, each updated data notification message 204 also includes an expiry date to enable BDU computing device 110 to identify updated biographical data 202 as described herein. In certain embodiments, multiple update requests 204 from merchant 104 and/or other trusted parties 103 may be collected by acquirer 108 and submitted to BDU computing device 110 as a batch request.

In response to receiving a data access request 205, BDU computing device 110 stores data 202 in BDU database 114 and generates a trusted party data access link 207 and provides trusted party data access link 207 to merchant 104. Trusted party data access link 207 is configured to provide user 106 biographical data 202 by providing access to user 106 biographical data 202 stored within the at least one BDU database 114. Trusted party data access link 207 is transmitted to merchant 104, wherein trusted party data access link 207 enables merchant 104 to access user biographical data 202. In the exemplary embodiment, trusted party data access link 207 is an internet-based HTML link code that a trusted party may use to receive biographical data 202. In some embodiments, trusted party data access link is a code snippet configured to enable dissemination of biographical data 202 to merchant 104 over a second network. In other embodiments, trusted party data access link 207 may include, for example, an internet-based communication link and/or an MPLS link to BDU computing device 110.

In the exemplary embodiment, BDU computing device 110 may receive updated user biographical data 202. BDU computing device 110 and/or BDU database 114 may maintain a record or log (not shown) that indicates when each record of biographical data 202 was updated by issuer 102 and the updated data notification message 204 was sent to merchant 104. If biographical data 202 was updated after the last updated data notification message 204 was sent to merchant 104, BDU computing device 110 identifies biographical data 202 as updated. In certain embodiments, if biographical data 202 has been updated, BDU computing device 110 maintains a record of historical biographical data over a predetermined period of time (e.g., two years) for each user 106 account stored in BDU database 114. By storing historical biographical data, BDU computing device 110 is configured to identify up-to-date biographical data 202 that corresponds to updated data notification messages 204 that include trusted party data access link 207 that links to out-of-date information.

BDU computing device 110 is configured to store any updated user biographical data 202 in BDU database 114 and electronically link the stored updated user biographical data 202 to trusted party data access link 207. BDU computing device 110 is configured to transmit user 106 updated data notification message 204 to merchant 104, wherein updated data notification message 204 includes trusted party data access link 207. In some embodiments, prior to transmitting updated data notification message 204, BDU computing device 110 may be configured to receive one or more settings from issuer 102 and/or user 106 to facilitate selective transmittal of biographical data 202 and/or card profile data 212 with updated data notification message 204. In particular, BDU computing device 110 may be configured to receive settings from issuer 102 to prevent particular merchants from receiving biographical data 202. In one example, issuer 102 blacklists a particular merchant that has been identified as compromised to prevent fraudulent activity with the updated biographical data 202. In some embodiments, user 106 may be provided an interface with BDU computing device 110 that enables user 106 to customize what card profile data 212 is provided to the merchants in addition to which trusted parties 103 are permitted to receive card profile data 212. In one embodiment, translator module 214 is configured to selectively prevent a portion of updated data notification message 204 from being generated based at least in part on the settings provided by issuer 102 and/or user 106.

In certain embodiments, updated data notification message 204 is generated based on biographical data 202 and card profile data 212 received from BDU database 110 and card profile database 116, respectively. In the example embodiment, BDU computing device 110 includes a translator module 214 that is configured to receive biographical data 202 and card profile data 212. Translator module 214 is configured to enable biographical data 202 and card profile data 212 to be unified into a single formatted response (i.e., updated data notification message 204) rather than forcing merchant 104 to separately parse biographical data 202 and card profile data 212. In particular, translator module 214 is configured to parse biographical data 202 and the profile query response with card profile data 212 into a plurality of data elements. Translator module 214 may also be configured to compare similar data elements from biographical data 202 and card profile data 212 to verify that both sets of data are associated with the same cardholder and/or to identify out-of-date information. Once the data is parsed, translator module 214 is configured to generate updated data notification message 204 including trusted party data access link 207 to allow access to the parsed data. In one example, updated data notification message 204 is generated in a JSON format. BDU computing device 110 is configured to transmit updated data notification message 204 to merchant 104 and/or acquirer 108 through acquirer interface 122. By providing a unified updated data notification message 204, BDU computing device 110 facilitates a reduced number of queries by merchant 104 to each database 114, 116 in addition to synchronizing data between two separate services to provide merchant 104 with enhanced information associated with account-on-file payment accounts.

During the BDU process, BDU computing device 110 retrieves biographical data 202 stored in BDU database 114 that is associated with updated biographical data 202. Additionally, BDU computing device 110 is configured to generate a card profile query 210 that includes account identifier 206 and transmit query 210 to card profile database 114. Query 210 is configured to request card profile data 212 associated with account identifier 206 from card profile database 116. BDU computing device 110 is configured to format card profile query 210 according to a searchable format for card profile database 116. In certain embodiments, when card profile database 116 includes a plurality of databases, BDU computing device 110 is configured to generate formatted queries 210 for one or more of the databases. In at least some embodiments, query 210 is generated and transmitted substantially simultaneously while BDU computing device 110 retrieving biographical data 202 from BDU database 114. In other embodiments, query 210 is generated and transmitted before or after biographical data 202 is retrieved. For example, BDU computing device 110 may replace account identifier 206 in query 210 with an updated account identifier from biographical data 202 if biographical data 202 has been updated.

In another example embodiment, BDU computing device 110 is further configured to offer a BDU service to provide updated biographical data 202 and additional data associated with user 106 of the payment accounts of biographical data 202 to merchant 104 and acquirer 108. In at least some embodiments, the additional data is associated with a service provided by a payment network that is separate from the BDU service. When merchant 104 and/or acquirer 108 registers for the BDU service, BDU computing device 110 stores a record for merchant 104 and/or acquirer 108 in a memory (not shown in FIGS. 1 and 2). When BDU computing device 110 receives updated biographical data 202, BDU computing device 110 performs a lookup of merchant 104 and/or acquirer 108. In other embodiments, acquirer interface 122 has separate communication channels for the BDU and BDU services such that BDU computing device 110 is configured to detect which communication channel is used to transmit data access request 205 and automatically identify which service merchant 104 is registered for based on the detected communication channel. A BDU process is initiated if BDU computing device 110 identifies merchant 104 and/or acquirer 108 as registered for the BDU service.

In the example embodiment, payment processor 112 is configured to receive, process, and/or transmit transaction data and other data (not shown) associated with one or more transactions within a payment network. Payment processor 112 is further configured to retrieve, generate, and/or otherwise determine card profile data 212 from the payment network. Card profile data 212 is stored within card profile database 116 by payment processor 112 for retrieval during the BDU process. Additionally or alternatively, at least a portion of card profile data 212 may be received from a different computing device. In one embodiment, card profile data 212 is stored in one or more tables within card profile database 116 that are configured to store specific types of card profile data 212. For example, card profile database 116 may include a first table for fraud history data and a second table for shopping behaviors.

Card profile database 116 is configured to receive query 210 and identify stored card profile data 212 that corresponds to the payment accounts and cardholders identified by query 210. In one example, card profile database 116 uses account identifier 206 or another account identifier within query 210 to perform a lookup of the stored card profile data. In some embodiments, query 210 may cause database 116 and/or payment processor 112 to retrieve and/or generate additional card profile data 212. Once the relevant card profile data 212 is identified, card profile database 116 is configured to generate a profile query response with the identified card profile data 212 and transmit the response to BDU computing device 110. In at least one embodiment, the profile query response and the retrieved biographical data 202 are provided in different formats to BDU computing device 110. In other embodiments, the profile query response and the retrieved biographical data 202 are provided in substantially similar formats.

Figure 3:
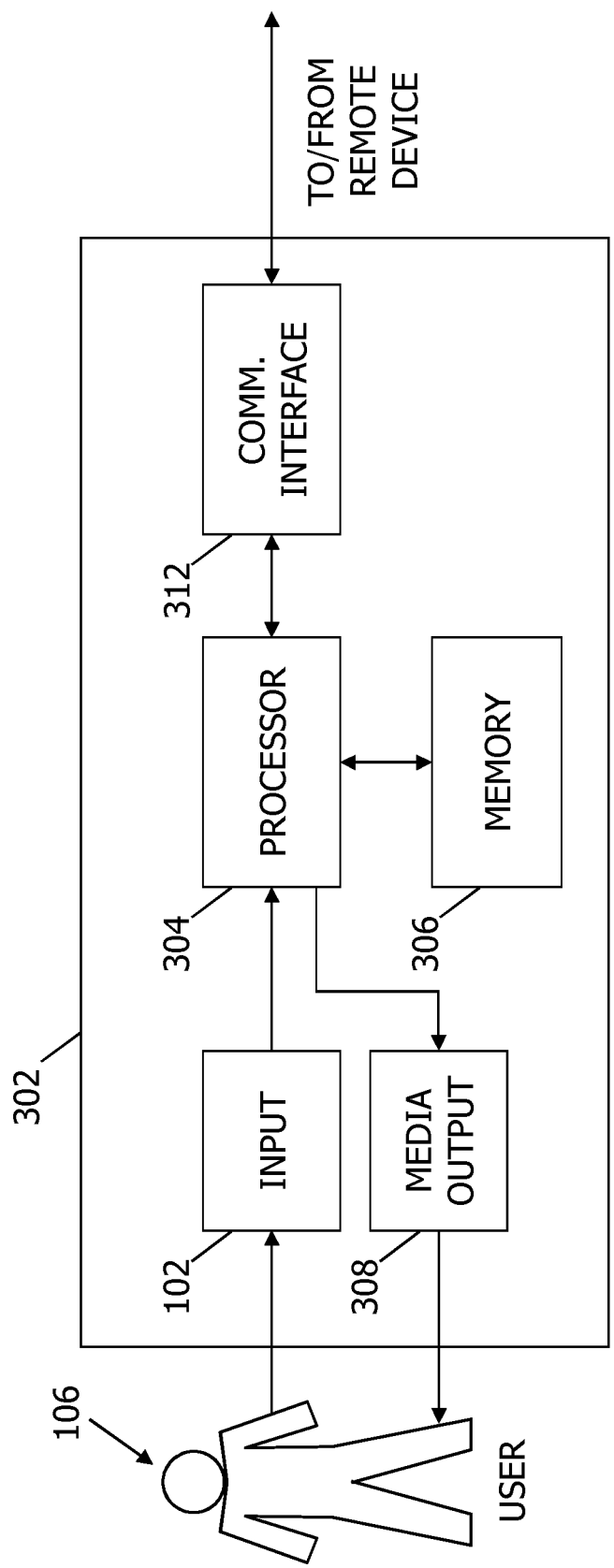

FIG. 3 depicts an exemplary configuration of a remote or user computing device 302, such as devices associated with issuer 102, merchant 104, user 106, and/or acquirer 108 (shown in FIG. 1). Computing device 302 may include a processor 304 for executing instructions. In some embodiments, executable instructions may be stored in a memory area 306. Processor 304 may include one or more processing units (e.g., in a multi-core configuration). Memory area 306 may be any device allowing information such as executable instructions and/or other data to be stored and retrieved. Memory area 306 may include one or more computer-readable media.

Computing device 302 may also include at least one media output component 308 for presenting information to a user 106. Media output component 308 may be any component capable of conveying information to user 106. In some embodiments, media output component 308 may include an output adapter, such as a video adapter and/or an audio adapter. An output adapter may be operatively coupled to processor 304 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, media output component 308 may be configured to present an interactive user interface (e.g., a web browser or client application) to user 106.

In some embodiments, computing device 302 may include an input device 310 for receiving input from user 106. Input device 310 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 308 and input device 310.

Computing device 302 may also include a communication interface 312, which may be communicatively coupleable to a remote device. Communication interface 312 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 306 are, for example, computer-readable instructions for providing user interface 124 to user 106 via media output component 308 and, optionally, receiving and processing input from input device 310. User interface 124 may include, among other possibilities, a web browser and client application. Web browsers enable users 106 to display and interact with media and other information typically embedded on a web page or a website from a web server associated with a merchant. A client application allows users 106 to interact with a server application associated with, for example, a vendor or business.

Figure 4:
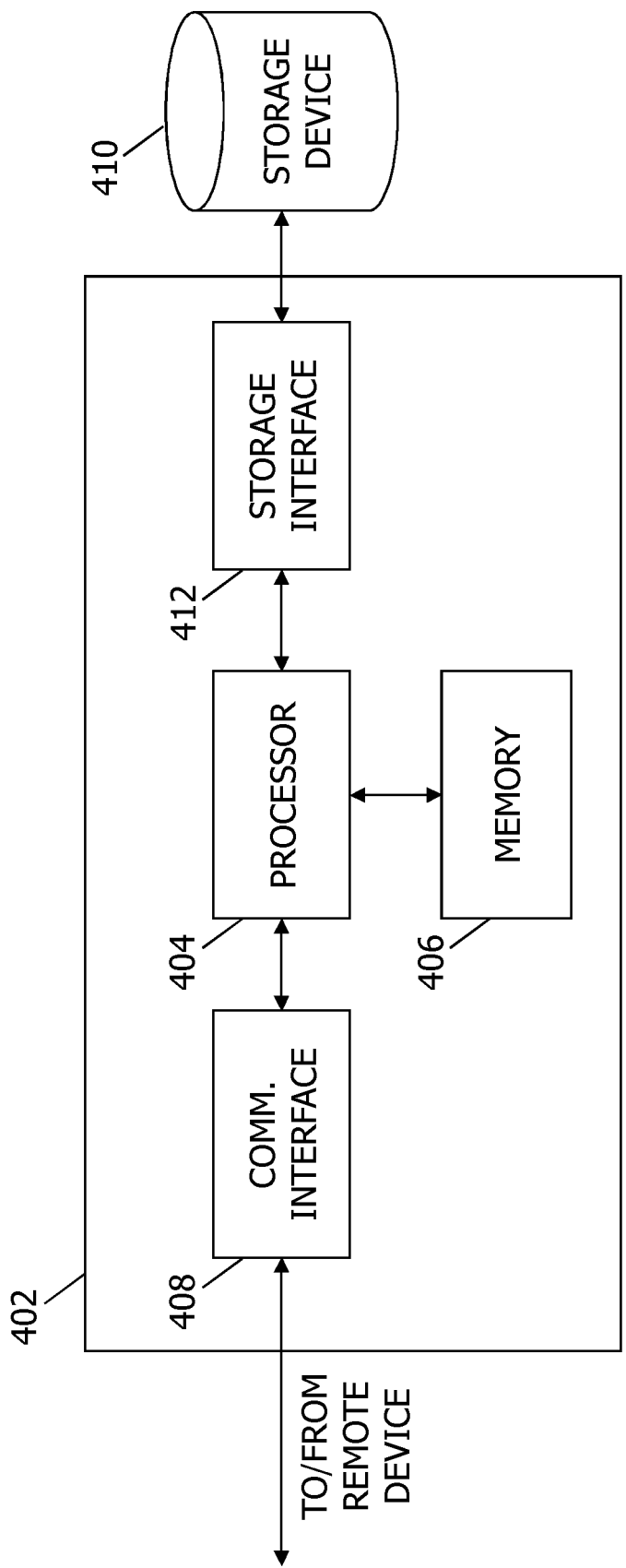

FIG. 4 depicts an exemplary configuration of a host computing device 402, such as BDU computing device 110 and payment processor 112 (shown in FIG. 1). Host computing device 402 may include a processor 404 for executing instructions. Instructions may be stored in a memory area 406, for example. Processor 404 may include one or more processing units (e.g., in a multi-core configuration).

Processor 404 may be operatively coupled to a communication interface 408 such that host computing device 402 may be capable of communicating with a remote device such as computing device 302 shown in FIG. 3 or another host computing device 402. For example, communication interface 408 may receive requests from user computing device 302 via the Internet.

Processor 404 may also be operatively coupled to a storage device 410. Storage device 410 may be any computer-operated hardware suitable for storing and/or retrieving data. In some embodiments, storage device 410 may be integrated in host computing device 402. For example, host computing device 402 may include one or more hard disk drives as storage device 410. In other embodiments, storage device 410 may be external to host computing device 402 and may be accessed by a plurality of host computing devices 402. For example, storage device 410 may include multiple storage units such as hard disks or solid state disks in a redundant array of inexpensive disks (RAID) configuration. Storage device 410 may include a storage area network (SAN) and/or a network attached storage (NAS) system.

In some embodiments, processor 404 may be operatively coupled to storage device 410 via a storage interface 412. Storage interface 412 may be any component capable of providing processor 404 with access to storage device 410. Storage interface 412 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 404 with access to storage device 410.

Memory areas 306 (shown in FIG. 3) and 406 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 5:
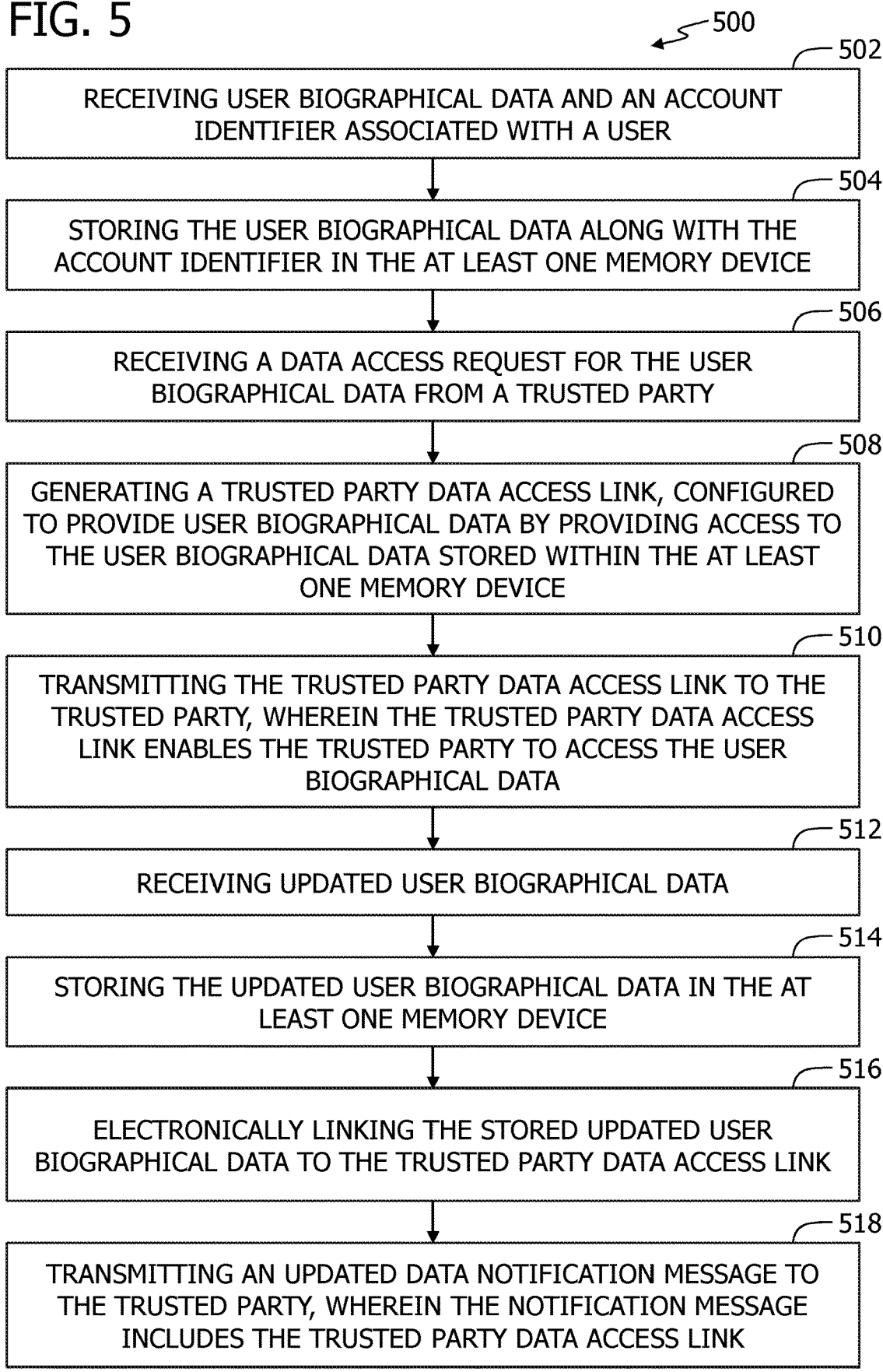

FIG. 5 is a flow diagram of an example method 500 for linking user biographical data to card profile data and transmitting the data to a trusted party using a BDU system, such as system 100 (shown in FIG. 1). In the example embodiment, method 500 is performed by a BDU computing device. In certain embodiments, method 500 may be at least partially performed by a different computing device. In other embodiments, method 500 may include additional, fewer, or alternative actions, including those described elsewhere herein.

Method 500 begins with the BDU computing device receiving 502 user biographical data and an account identifier associated with a user. The BDU computing device stores 504 the user biographical data along with the account identifier in the at least one memory device. In the example embodiment, the BDU computing device receives 506 a data access request for the user biographical data from a trusted party. The BDU computing device generates 508 a trusted party data access link configured to provide user biographical data by providing access to the user biographical data stored within the at least one memory device. The BDU computing device transmits 510 the trusted party data access link to the trusted party, wherein the trusted party data access link enables the trusted party to access the user biographical data. The BDU computing device receives 512 updated biographical data and stores 514 the updated user biographical data in the at least one memory device. The BDU computing device electronically links 516 the stored updated user biographical data to the trusted party data access link. The BDU computing device transmits 518 an updated data notification message to the trusted party, wherein the notification message includes the trusted party data access link.

Figure 6:
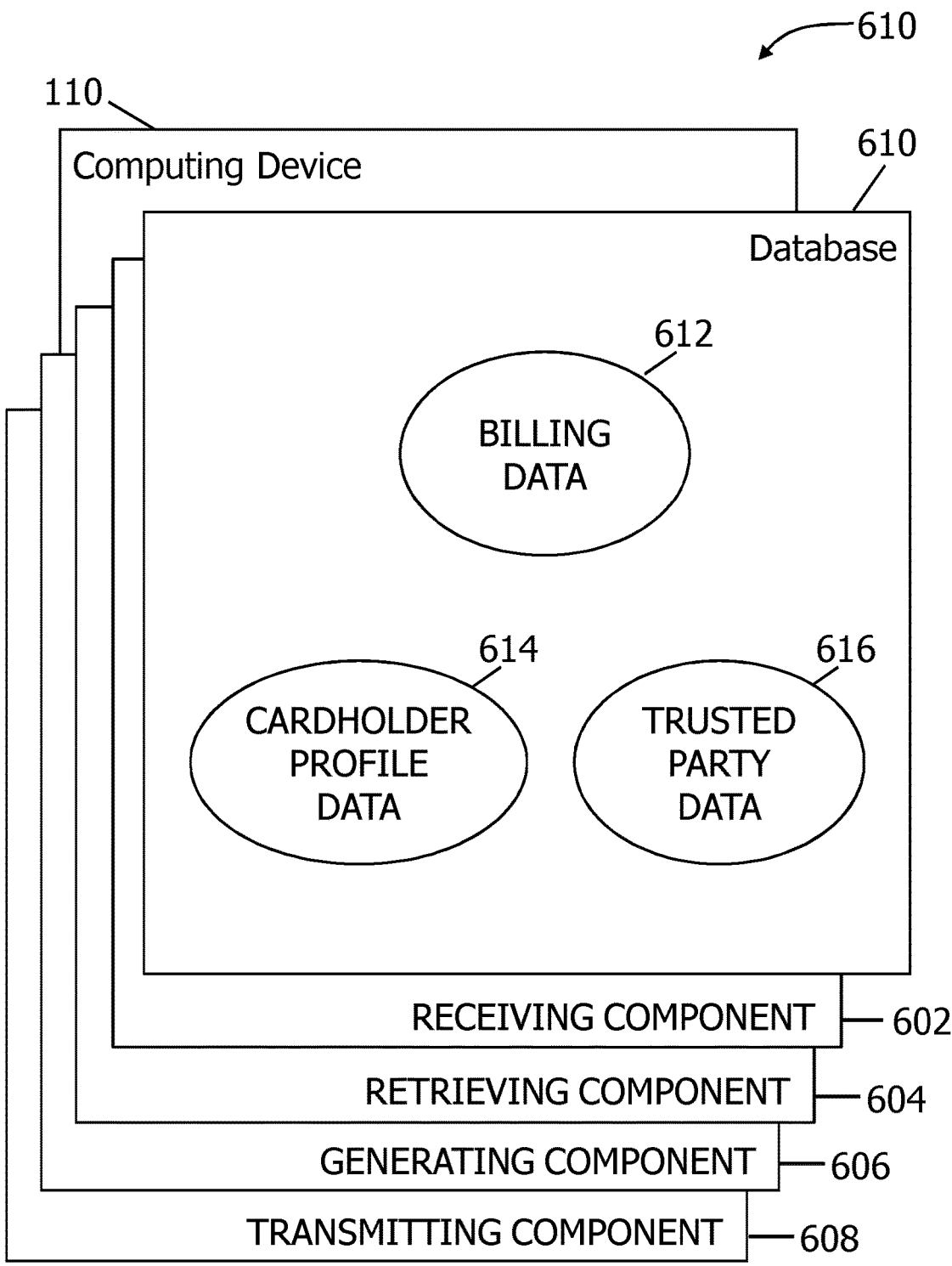

FIG. 6 is a diagram 600 of components of one or more example computing devices that may be used in the method shown in FIG. 5. FIG. 6 further shows a configuration of a database system 610 including at least BDU database 114 and card profile database 116 (shown in FIG. 1). Database system 610 is coupled to several separate components within BDU computing device 110 (shown in FIG. 1), which perform specific tasks.

BDU computing device 110 includes a receiving component 602 configured to receive a biographical data access request and a biographical data update request associated with a user payment account over a first network. Receiving component 602 is further configured to receive card profile data associated with the user payment account from a card profile database. BDU computing device 110 further includes a retrieving component 604 configured to retrieve biographical data associated with the user payment account from a biographical database. BDU computing device 110 also includes a generating component 606 configured to generate a user biographical data query and a card profile query including an account identifier of the update request. Generating component 606 is further configured to generate an update response message including the retrieved biographical data and the received card profile data. BDU computing device 110 further includes a transmitting component 608 configured to transmit the card profile query over a second network separate from the first network. Transmitting component 608 is further configured to transmit the update response message over the first network to the data access communications link for at least one of an acquirer and a merchant associated with the update request.

In an exemplary embodiment database system 610 is divided into a plurality of sections, including but not limited to, a biographical data section 612, a card profile data section 614, and a trusted party data section 616. Trusted party data section 616 may include, for example, a list of registered merchants for the BDU service and/or the settings provided by issuers or cardholders to provide selective access to the update response message. These sections are separated between databases 114, 116 (e.g., biographical data 202 is stored in BDU database 114). Databases 114, 116 are interconnected through BDU computing device 110 to update and retrieve the information as required.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An automatic user biographical data updater (BDU) computing device for automatically updating user biographical data, the BDU computing device including at least one processor in communication with at least one memory device, said BDU computing device configured to:
  receive, from a payment processor of a payment network, user card profile data associated with an account of a user;
  receive user biographical data and an account identifier associated with the account of the user;
  store the user biographical data along with the account identifier in the at least one memory device;
  receive a data access request for the user biographical data and the user card profile data from a trusted party;
  generate a link identifying the location of a network-based resource that provides access to the user biographical data stored within the at least one memory device and the user card profile data;
  transmit the link to the trusted party, wherein the link enables the trusted party to access the user biographical data from the at least one memory device and the user card profile data;
  receive updated user biographical data and updated user card profile data;
  store the updated user biographical data in the at least one memory device;
  associate the updated user card profile data and the stored updated user biographical data with the link; and
  transmit an updated data notification message to the trusted party, wherein the notification message includes the link.

2. The BDU computing device of claim 1, wherein the biographical data update request is processed over a payment network wherein the user interacts with the payment network using a payment account associated with the user account identifier at a POS device or through a merchant website.

3. The BDU computing device of claim 2, wherein the data update request is received by said BDU computing device as an ISO 8583 authorization computer message from a trusted party, the data update request including the user account identifier.

4. The BDU computing device of claim 3, wherein the user is a cardholder, the BDU computing device configured to be communicatively coupled to the payment processor of the payment network to receive the user card profile data.

5. The BDU computing device of claim 4, wherein the user card profile data includes at least one of fraud history, a loyalty customer profile, a chargeback history, historical transaction data, a customer loyalty profile, a spending behavior profile, location information, and cardholder information associated with the user account identifier.

6. The BDU computing device of claim 4, wherein the BDU computing device is further configured to:
detect merchants that are registered for the BDU service by performing a lookup of a list of registered trusted parties of the BDU service stored in the memory;
compare the user card profile data with the list of registered trusted parties; and
suggest, to the user, potential trusted parties based on merchants the user has interacted with.

7. The BDU computing device of claim 1, wherein the BDU computing device is further configured to:
generate a biographical data update when the user biographical data associated with an account identifier is updated; and
transmit the user biographical data update to the trusted party.

8. A computer-implemented method for automatically updating user biographical data, the method implemented using a biographical data updater (BDU) computing device including at least one processor in communication with at least one memory device, said method comprising:
receiving, from a payment processor of a payment network, user card profile data associated with an account of a user;
receiving user biographical data and an account identifier associated with the account of the user;
storing the user biographical data along with the account identifier in the at least one memory device;
receiving a data access request for the user biographical data and the user card profile data from a trusted party;
generating a link identifying the location of a network-based resource that provides access to the user biographical data stored within the at least one memory device and the user card profile data;
transmitting the link to the trusted party, wherein the link enables the trusted party to access the user biographical data from the at least one memory device and the user card profile data;
receiving updated user biographical data and updated user card profile data;
storing the updated user biographical data in the at least one memory device;
associating the updated user card profile data and the stored updated user biographical data with the link; and
transmitting an updated data notification message to the trusted party, wherein the notification message includes the link.

9. The method of claim 8, wherein the biographical data update request is processed over a payment network wherein the user interacts with the payment network using a payment account associated with a user account identifier at a POS device or through a merchant website.

10. The method claim 9, wherein the biographical data update request is received by said BDU computing device as an ISO 8583 authorization computer message from a trusted party, the biographical update request including a user account identifier.

11. The method of claim 10, wherein the user is a cardholder, the BDU computing device configured to be communicatively coupled to the payment processor of the payment network to receive the user card profile data.

12. The method of claim 11, wherein the user card profile data includes at least one of fraud history, a loyalty customer profile, a chargeback history, historical transaction data, a customer loyalty profile, a spending behavior profile, location information, and cardholder information associated with the user account.

13. The method of claim 11 further comprising:
detecting merchants that are registered for the BDU service by performing a lookup of a list of registered trusted parties of the BDU service stored in the memory;
comparing user card profile data with the list of registered trusted parties; and
suggesting, to the user, potential trusted parties based on merchants the user has interacted with.

14. The method of claim 8 further comprising:
generating a biographical data update when the user biographical data associated with an account identifier is updated; and
transmitting the user biographical data update to the trusted party.

15. A non-transitory computer readable medium that includes computer executable instructions for automatically updating user biographical data by a computing device, wherein when executed by a biographical data updater (BDU) computing device including a processor and a memory device, the computer executable instructions cause the BDU computing device to:
receive, from a payment processor of a payment network, user card profile data associated with an account of a user;
receive user biographical data and an account identifier associated with the account of the user;
store the user biographical data along with the account identifier in the at least one memory device;
receive a data access request for the user biographical data and the user card profile data from a trusted party;
generate a link identifying the location of a network-based resource that provides access to the user biographical data stored within the at least one memory device and the user card profile data;
transmit the link to the trusted party, wherein the link enables the trusted party to access the user biographical data from the at least one memory device and the user card profile data;
receive updated user biographical data and updated user card profile data;
store the updated user biographical data in the at least one memory device;
associate the updated user card profile data and the stored updated user biographical data with the link; and
transmit an updated data notification message to the trusted party, wherein the notification message includes the link.

16. A non-transitory computer readable medium in accordance with claim 15, wherein the biographical data update request is processed over a payment network wherein the user interacts with the payment network using a payment account associated with a user account identifier at a POS device or through a merchant website.

17. A non-transitory computer readable medium in accordance with claim 16, wherein the biographical data update request is received by said BDU computing device as an ISO 8583 authorization computer message from a trusted party, the biographical update request including a user account identifier.

18. A non-transitory computer readable medium in accordance with claim 17, wherein the user is a cardholder, the BDU computing device configured to be communicatively coupled to the payment processor of the payment network to receive the user card profile data.

19. A non-transitory computer readable medium in accordance with claim 18, wherein the user card profile data includes at least one of fraud history, a loyalty customer profile, a chargeback history, historical transaction data, a customer loyalty profile, a spending behavior profile, location information, and cardholder information associated with the user account.

20. A non-transitory computer readable medium in accordance with claim 18, wherein the BDU computing device is further configured to:
    detect merchants that are registered for the BDU service by performing a lookup of a list of registered trusted parties of the BDU service stored in the memory;
    compare user card profile data with the list of registered trusted parties; and
    suggest, to the user, potential trusted parties based on merchants the user has interacted with.

21. A non-transitory computer readable medium in accordance with claim 15, wherein the BDU computing device is further configured to:
    generate a biographical data update when the user biographical data associated with an account identifier is updated; and
    transmit the user biographical data update to the trusted party.

\* \* \* \* \*

UNITED STATES PATENT AND TRADEMARK OFFICE
CERTIFICATE OF CORRECTION

Page 1 of 1

PATENT NO. : 10,599,628 B2
APPLICATION NO. : 15/612807
DATED : March 24, 2020
INVENTOR(S) : Muhammad Yaseen Ali It is certified that error appears in the above-identified patent and that said Letters Patent is hereby corrected as shown below:

In the Specification

Column 7, Line 43, delete "cable interne." and insert therefor -- cable internet. --.

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*